United States Patent
Richards

[11] 3,720,371
[45] March 13, 1973

[54] PILOTED SELECTOR ASSEMBLY
[75] Inventor: Gary E. Richards, Lockport, N.Y.
[73] Assignee: General Motors Corporation, Detroit, Mich.
[22] Filed: Dec. 9, 1971
[21] Appl. No.: 206,262

[52] U.S. Cl. .................... 237/2 A, 91/385, 165/24, 165/42, 237/12.3 A
[51] Int. Cl. .............................. F25b 29/00
[58] Field of Search ...... 165/24, 42; 237/2 A, 12.3 A; 91/385, 387

[56] References Cited

UNITED STATES PATENTS

| | | | |
|---|---|---|---|
| 3,263,739 | 8/1966 | Gaskill et al. | 165/28 X |
| 3,476,316 | 11/1969 | Franz | 237/2 A |
| 3,490,518 | 1/1970 | Herbon | 165/42 |
| 3,662,818 | 5/1972 | Snyder | 165/42 X |

*Primary Examiner*—William F. O'Dea
*Assistant Examiner*—Peter D. Ferguson
*Attorney*—W. S. Pettigrew et al.

[57] ABSTRACT

A piloted mode selector assembly for an automobile air conditioning system for remotely setting a rotary vacuum selector valve by the movement of a dashboard control member. The control member and an air bleed valve of the mode selector are linked by a Bowden type wire. Movement of the Bowden wire corresponding to a new mode setting of the control member opens and closes the air bleed valve which is fluidly connected to a vacuum and spring operated actuator. This varies the vacuum pressure in the actuator which rotates the vacuum selector valve and repositions the air bleed valve so as to maintain the new selector position.

3 Claims, 4 Drawing Figures

PATENTED MAR 13 1973

VACUUM SOURCE

INVENTOR.
Gary E. Richards
BY
K. H. MacLean, Jr.
ATTORNEY

INVENTOR.
Gary E. Richards
BY
K. H. MacLean, Jr.
ATTORNEY

PILOTED SELECTOR ASSEMBLY

This invention relates to a piloted selector assembly for an automobile air conditioning system including vacuum and spring operated actuator for positioning a rotary vacuum valve.

Automatic temperature control systems used in automobiles provide means for manually selecting function modes other than automatic heating and cooling. Examples of these modes are: OFF, VENT, DEFOG, and DE-ICE. Vacuum motors are used to move dampers or other members to produce various modes of operation. A rotary type vacuum valve directs vacuum pressure to the appropriate vacuum motor. It is desirable to locate the vacuum valve in close proximity to the vacuum motors and consequently, means are needed to link a dashboard control to the remote rotary vacuum valve. Bowden type wires are often used to directly operate a vacuum valve from a control member. This is not always desirable because of high friction losses between the Bowden wire and its sleeve which make movement of the control difficult. In addition, a push-pull Bowden wire requires minimum bending to reduce the forces required to move the wire and associated members.

Another disadvantage of Bowden type wires which are used between members to transmit forces results from the difference between the diameter of the inner wire and the diameter of the surrounding sleeve. The resultant position of a member which is moved by the wire will be different depending upon whether the wire was pushed or pulled in the sleeve. This problem is diminished as the force transmitted is decreased.

The present piloted selector assembly eliminates the above-mentioned problems. A Bowden wire extending between the dashboard control and a remotely located air bleed vacuum valve is used as a positioner without the transmittal of any significant forces. The relatively frictionless air bleed valve moved by the wire produces a variable vacuum pressure which powers a vacuum and spring operated actuator. The actuator provides the force required to move a rotary vacuum valve selector.

Therefore, an object of the present invention is to provide a piloted selector assembly with a vacuum actuator for moving a vacuum selector valve to positions corresponding to settings of a control assembly which is connected by a Bowden wire to an easily moved air bleed valve for developing vacuum pressure in the actuator.

A further object of the invention is to provide a piloted selector assembly having a vacuum actuator to move a vacuum selector valve to positions corresponding to settings of a control assembly which is connected by a Bowden wire to a freely pivotal member which coacts with an air bleed valve to develop vacuum pressure in the actuator for moving the selector valve.

Further objects and advantages of the present invention will be readily apparent from the following detailed description, reference being had to the accompanying drawings in which a preferred embodiment of the present invention is clearly shown.

Figure 1:
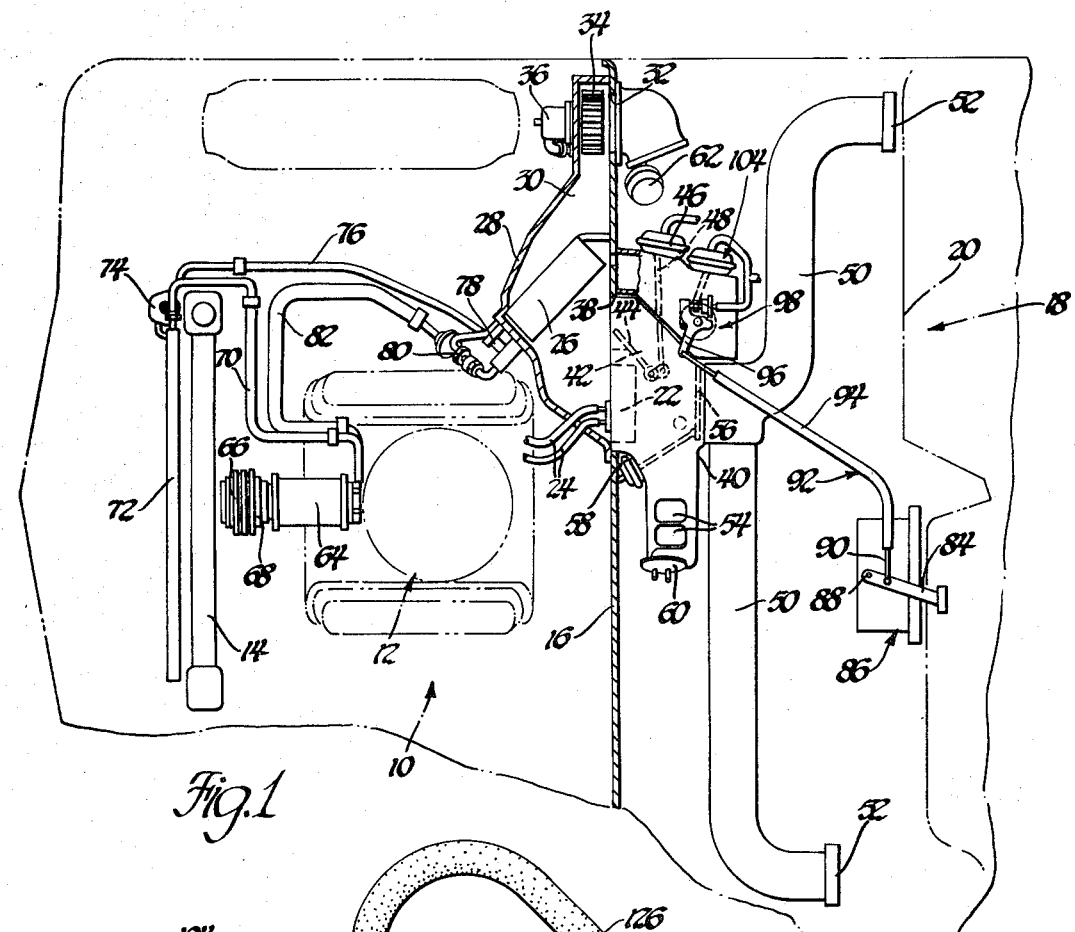
FIG. 1 is a horizontal sectional view of the forward portion of an automobile having the present piloted selector assembly.
Figure 2:
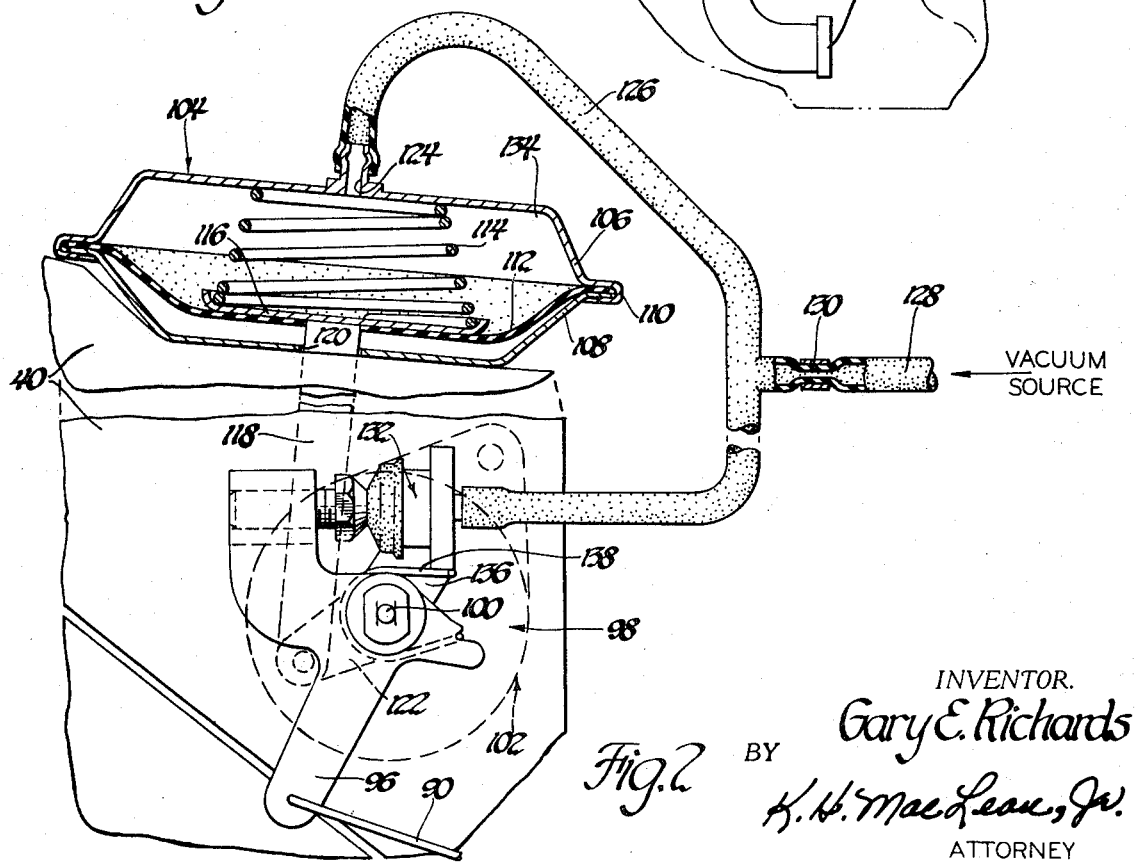
FIG. 2 is an enlarged view of the piloted selector assembly shown in FIG. 1 and broken away to reveal the vacuum actuator.

An automobile shown in FIG. 1 includes an engine compartment 10 having an internal combustion engine 12 supported therein. An engine radiator 14 is positioned forwardly of the engine. A firewall 16 extends between the engine compartment 10 and a passenger compartment 18. Broken lines extending across the front of the passenger compartment 18 define a dashboard 20 in passenger compartment 18.

The automobile is equipped with a heating and air conditioning system including a heater core 22 connected to the engine coolant system by hoses 24. An evaporator core 26 is supported within a duct 28 which with the firewall 16 forms a plenum chamber 30. Air is drawn from the passenger compartment 18 through an inlet 32 in firewall 16 by a blower 34 which is rotated by an electric motor 36. The air first passes through evaporator core 26 and then flows through an opening 38 in the firewall 16 into an air distributor duct 40 for discharge into the passenger compartment 18. The air may pass through the heater core 22 or through a bypass 42 after flowing through opening 38. An air mix damper 44 proportions the flow of air between the heater core 22 and the bypass 42. The air mix damper 44 is moved between a maximum cooling position directing all the air through bypass 42 as shown in FIG. 1 and a maximum heating position directing all the air through the heater core 22. The level of vacuum pressure applied to a vacuum motor 46 determines the position of damper 44. The vacuum motor 46 is connected to the air mix damper 44 by an arm 48.

Air is discharged from the air distributor duct 40 either through a heater opening in the bottom of duct 40 (not visible in FIG. 1), upper level hoses 50 and outlets 52 or through defrost openings 54. A mode door 56 opens and closes in response to pressurization of a vacuum motor 58. It either directs warm air through the heater opening or cooler air through the openings 52. Another vacuum motor 60 operates a defrost door (not visible in FIG. 1) to direct warm air through opening 54 against the front windshield for defrosting. Still another vacuum motor 62 controls an air inlet door (not visible in FIG. 1) which admits outside air into the plenum 30 during certain modes of operation of the heating and air conditioning system.

The air conditioning system itself includes a compressor 64 which is driven by the crankshaft of the engine 12 through a pulley 66 and electromagnetic clutch 68. The outlet of the compressor is connected by a conduit 70 to the inlet of a condenser 72 which is located in front of radiator 14. The outlet of condenser 72 is connected to a receiver-dehydrator assembly 74 which in turn is connected by a conduit 76 to an expansion valve means 78. The expansion valve means 78 is connected to the inlet of the evaporator core 26 whose outlet is connected to a throttling valve means 80. The throttling valve means 80 is connected by suction conduit 82 to the inlet of compressor 64. Refrigerant is pressurized in compressor 64 and flows through conduit 70 to the condenser 72 where it is liquefied and cooled. The receiver-dehydrator 74 traps vaporous refrigerant and passes liquid refrigerant to the expansion valve means 78 through the conduit 76. The expansion valve means 78 expands the high pressure refrigerant to a low pressure condition and discharges it into the evaporator core 26. There it is vaporized by absorbing heat from air passing through the evaporator. The refrigerant then passes through the throttling valve means 80 and suction conduit 82 into the inlet of compressor 64. The throttling valve 80 maintains the refrigerant pressure within the evaporator 26 above a predetermined pressure and temperature to prevent evaporator freezing.

The air conditioning and heating system illustrated in FIG. 1 can be operated in a variety of functional modes such as: VENT, AUTOMATIC, DEFOG, and DE-ICE. In addition, of course, the system may be turned off. These modes of operation are selected by movement of a control lever 84 in a control assembly 86. The control assembly 86 is supported behind the dashboard 20 of the automobile with the lever 84 projecting through a slot in the dashboard. The mode settings of the control lever are printed upon the face of control assembly 86.

Figure 3:
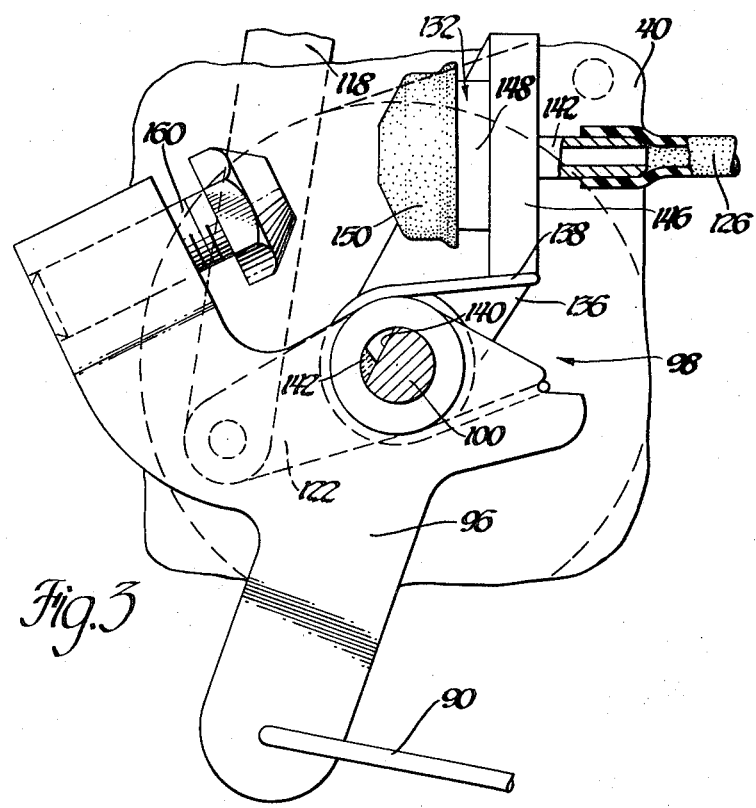
FIG. 3 is a view similar to FIG. 2 of the selector assembly in one mode of operation.

Lever 84 is pivoted at 88 and connected to one end of the inner wire 90 of a Bowden type cable 92. The outer sheath or sleeve 94 of the Bowden cable 92 is secured at one end to the frame of the control assembly 86 and secured at the other end to the duct 40. The inner wire 90 of the Bowden cable 92 is adapted to move within the stationary sleeve 94 in response to pivoting of lever 84. The other end of the wire 90 is connected to a positioner lever 96 of a selector assembly 98 best shown in FIGS. 3 and 4. The positioner lever 96 is pivotally mounted on a shaft 100 of a rotary type vacuum selector valve 102. The shaft 100 of the vacuum valve 102 is connected to a rotor which is rotatable with the shaft 100. Channels within the valve 102 serve to connect various inlet fittings on the frame of the vacuum valve as the rotor is rotated. These interconnect the vacuum motors 58, 60 and 62 with a source of vacuum pressure such as the intake manifold. The vacuum motors move dampers to produce the various function modes. Rotary type vacuum selector valves are disclosed more fully in U.S. Pat. No. 3,263,739 to Gaskill et al. issued Aug. 2, 1966.

The rotor of the vacuum valve 102 is pivoted by a vacuum and spring operated actuator 104 which is supported by duct 40. The actuator 104 includes a pair of cup-shaped portions 106 and 108 joined at their periphery by a turned over portion 110. A flexible diaphragm 112 extends across the interior of the actuator 104 and is held at its edge between portions 106 and 108. A spring 114 extends between portion 106 and a back-up plate 116 on one side of the diaphragm 112. An arm 118 is fastened to back-up plate 112 and extends through an opening 120 in portion 108. The end of arm 118 is connected to a lever 122 for rotating the rotor and shaft 100 of the vacuum valve 102.

The chamber formed between diaphragm 112 and portion 106 has an inlet fitting 124 which is connected by a vacuum hose 126 to a source of vacuum pressure which maybe the intake manifold of an internal combustion engine. The vacuum source is connected to hose 126 by a vacuum hose 128. A reduced diameter orifice portion 130 produces a relatively constant vacuum pressure from the variable pressure intake manifold. The hose 126 is also connected to an air bleed valve assembly 132 to admit a controlled quantity of air into the hose 126 to change the vacuum pressure level within the actuator chamber 134. The air bleed valve assembly 132 is supported by a regulator lever 136 which is pivotally mounted on shaft 100. Regulator lever 136 is angularly positioned with respect to the positioner lever 96 by a torsion type spring 138 extending from the lever 96, around the shaft 100 and to the lever 136. The spring 138 tends to position the levers 96 and 136 as in FIG. 3.

Figure 4:
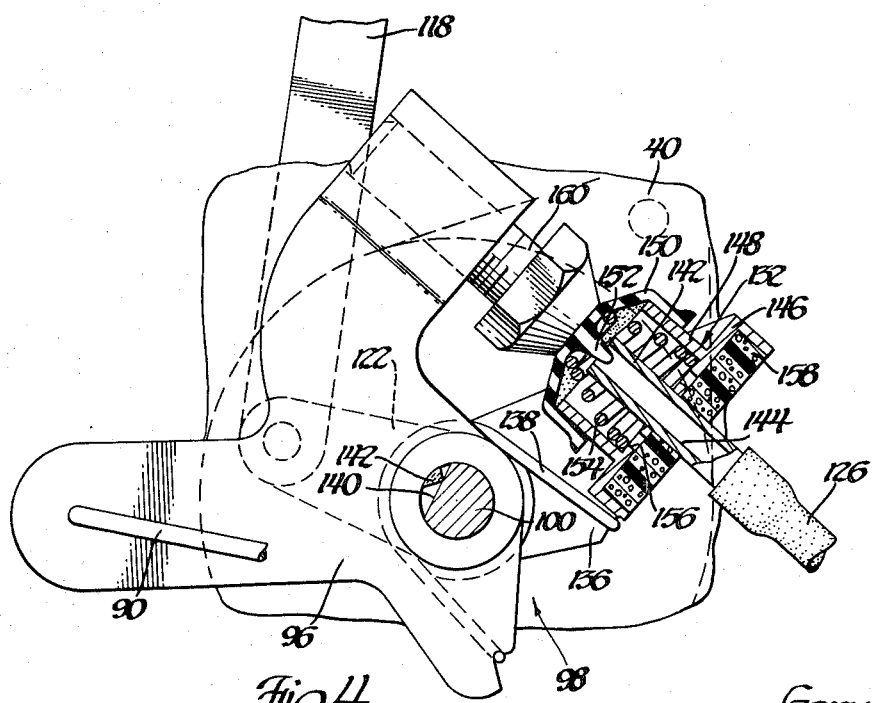
FIG. 4 is a view similar to FIG. 2 of the selector assembly in another mode of operation.

A flat 140 on shaft 100 coacts with a projection 142 in the bore of lever 136 to interconnect shaft 100 and lever 136 for rotation together after permitting a limited rotation relative to one another. LImited clockwise rotation of lever 96 against lever 136 as in FIG. 4, is necessary when the control 86 is set to cause the lever 96 to rotate against the air bleed valve assembly 132. When the lever 96 is rotated clockwise, the regulator lever 136 pivots clockwise a limited rotation with respect to shaft 100 before projection 142 and flat 140 engage.

The air bleed valve 132 is detailed in FIG. 4 and includes a nozzle 142 defining an air bleed passage 144. The air bleed passage 144 is connected to hose 126 and to the inlet 124 of actuator 104. Nozzle 142 extends through a base 146 which includes a circular wall portion 1480 A flexible diaphragm 150 is fastened around the wall portion 148 and across the end of nozzle 142. A central portion 152 of diaphragm 150 is adapted to project into the passage 144 to control air flow therein. The diaphragm 150 is normally spaced from the end of nozzle 142 by a spring 154. Air inlet ports 156 in base 146 permit air to flow through filter 158 into the air bleed passage 144. An adjustable member 160 which is threadably supported by the lever 96 coacts with diaphragm 150 to open and close the air bleed passage 144 in response to movement of the wire 90 of the Bowden cable 92.

When the control 86 is set to a desired mode, the wire 90 moves the positioner lever 96 into a predetermined position. This causes the member 160 to engage diaphragm 150 and develop vacuum pressure which causes the actuator 104 to pivot lever 122, shaft and rotor 100. If the control assembly 86 causes the positioner lever 96 to rotate counterclockwise as in FIG. 3, the diaphragm 150 of the valve assembly 132 will be spaced from the nozzle 142 and air will be bled into hose 126. This produces a weak vacuum level in actuator 104 which enables spring 114 to move the lever 122 and the shaft 100 in a counterclockwise direction toward member 160 on the positioner lever 96. When the member 160 and diaphragm 150 engage one another, the vacuum in the actuator 104 is reestablished so as to position the valve assembly 132 adjacent member 160. When the rotor and shaft 100 are pivoted to a new position, vacuum pressure is directed to an appropriate vacuum motor 58, 60 and 62 to produce the desired mode function.

When the control 86 rotates positioner lever 96 clockwise as in FIG. 4, the member 160 engages diaphragm 150 and pivots the valve assembly 132 clockwise about the shaft 100. Limited rotation of the valve 132 and regulator lever 136 is possible before the projection 142 engages the flat 140 of shaft 100. In this position, the member 160 forces the central portion 152 of diaphragm 150 into the air bleed passage 144 to produce maximum vacuum pressure in the actuator 104. This causes movement of diaphragm 112 and back-up plate 116 toward member 106 and pivots the rotor and shaft 100 clockwise to a new mode setting. At the same time, the rotation of shaft 100 causes projection 142 to engage the flat 140 to relieve the force produced by spring 138 on the regulator lever 136.

The Bowden wire is used only to position the freely rotatable positioner lever. Thus, no significant force is required to be transitted between the control 86 and the assembly 98 to change the setting of the vacuum selector valve 102. The vacuum pressure developed by the assembly in the actuator 104 provides the force necessary to pivot the vacuum selector valve.

While the embodiment of the invention shown in the drawings and described above is a preferred embodiment, other embodiments may be adapted.

What is claimed is as follows:

1. A piloted mode selector assembly for an automobile heating and air conditioning system comprising: a control member in the automobile passenger compartment movable by the occupant between different settings corresponding to various functional modes; a rotary vacuum selector valve having an interconnected rotor and shaft for alternately directing vacuum pressure from a vacuum pressure source to various vacuum motors in response to angular rotation of the rotor; a vacuum and spring operated actuator connected to the vacuum pressure source; means between said actuator and said rotary valve for rotating said rotor thereby directing vacuum pressure to said vacuum motors; a positioner member pivotally mounted on said shaft and freely rotatable thereabout; means operably connecting said control member and said positioner member to rotate said positioner member about said shaft into positions corresponding to mode setting of the control member; a vacuum regulator member pivotally mounted on said shaft and supporting an air bleed valve assembly; said air bleed valve assembly including a bleed passage fluidly connecting said vacuum and spring operated actuator to atmosphere for changing the level of vacuum pressure therein; a valve member normally spaced from the end of said air bleed passage and movable to block said passage in response to relative rotation between said positioner and regulator members which causes said positioner member to coact with said valve member; means connecting said regulator member and shaft for rotation together after limited relative angular movement in one direction whereby said positioner member may be moved away from and toward said air bleed valve assembly to open and close said air bleed passage to control the admission of air into said actuator to pivot said rotary vacuum valve and regulator member to a position corresponding to the setting of the control member.

2. A piloted mode selector assembly for an automobile heating and air conditioning system comprising: a control member in the automobile passenger compartment movable by the occupant between different settings corresponding to various functional modes; a rotary vacuum selector valve having an interconnected rotor and shaft for alternately directing vacuum pressure from a vacuum pressure source to various vacuum motors in response to angular rotation of the rotor; a vacuum and spring operated actuator connected to the vacuum pressure source; means between said actuator and said rotary valve for rotating said rotor thereby directing vacuum pressure to said vacuum motors; a positioner member pivotally mounted on said shaft and freely rotatable thereabout; means operably connecting said control member and said positioner member to rotate said positioner member about said shaft into positions corresponding to mode setting of the control member; a vacuum regulator member pivotally mounted on said shaft and supporting an air bleed valve assembly; said air bleed valve assembly including a bleed passage fluidly connecting said vacuum and spring operated actuator to atmosphere for changing the level of vacuum pressure therein; a valve member normally spaced from the end of said air bleed passage and movable to block said passage in response to relative rotation between said positioner and regulator members which causes said positioner member to coact with said valve member; means connecting said regulator member and shaft for rotation together after limited relative angular movement between said regulator member and said shaft; said means including a projecting portion on said regulator member coactive with a flat portion of said shaft to permit the regulator member to rotate on said shaft until the projecting portion contacts said shaft, whereby said positioner member may be moved away from and toward said air bleed valve assembly to open and close said air bleed passage to control the admission of air into said actuator to pivot said rotary vacuum valve and regulator member to a position corresponding to the setting of the control member.

3. A piloted mode selector assembly for an automobile heating and air conditioning system comprising: a control member in the automobile passenger compartment movable by the occupant between different settings corresponding to various functional modes; a rotary vacuum selector valve having an interconnected rotor and shaft for alternately directing vacuum pressure from a vacuum pressure source to various vacuum motors in response to angular rotation of the rotor; a vacuum and spring operated actuator connected to the vacuum pressure source; means between said actuator and said rotary valve for rotating said rotor thereby directing vacuum pressure to said vacuum motors; a positioner member pivotally mounted on said shaft and freely rotatable thereabout; means operably connecting said control member and said positioner member to rotate said positioner member about said shaft into positions corresponding to mode settings of the control member; a vacuum regulator member pivotally mounted on said shaft and supporting an air bleed valve assembly; said air bleed valve assembly including a bleed passage fluidly connecting said vacuum and spring operated actuator to atmosphere for changing the level of vacuum pressure therein; a valve member with a central portion overlying the end of said air bleed passage; spring means normally spacing the central portion of said valve member from said end of said bleed passage for maintaining said passage open to allow air to enter; an adjustable member supported by said positioner member adapted to engage said valve member and close said air bleed passage in response to rotation of said positioner member by said control assembly; means connecting said regulator member and said shaft for rotation together after limited relative angular movement in one direction including a projecting portion on said regulator member coactive with a flat portion of said shaft to permit the regulator member to rotate on said shaft until the projecting portion engages said shaft, whereby said positioner member may be moved away from and toward said air bleed valve assembly to open and close said air bleed passage to control the admission of air into said actuator for pivoting said rotary vacuum valve and regulator member to a position corresponding to the setting of the control member.

* * * * *